US008233719B2

(12) United States Patent
Wredenhagen

(10) Patent No.: US 8,233,719 B2
(45) Date of Patent: Jul. 31, 2012

(54) METHOD AND APPARATUS FOR DETERMINING IMAGE CONTENT

(75) Inventor: Gordon F. Wredenhagen, Toronto (CA)

(73) Assignee: ATI Technologies ULC, Markham (CA)

( * ) Notice: Subject to any disclaimer, the term of this patent is extended or adjusted under 35 U.S.C. 154(b) by 1240 days.

(21) Appl. No.: 11/961,330

(22) Filed: Dec. 20, 2007

(65) Prior Publication Data

US 2009/0161987 A1    Jun. 25, 2009

(51) Int. Cl.
 *G06K 9/46* (2006.01)
 *G06K 9/00* (2006.01)
 *G06K 9/66* (2006.01)
(52) U.S. Cl. .................. 382/203; 382/181; 382/190
(58) Field of Classification Search .............. None
See application file for complete search history.

(56) References Cited

U.S. PATENT DOCUMENTS

| | | | |
|---|---|---|---|
| 7,421,124 B2* | 9/2008 | Kitora et al. | 382/181 |
| 2005/0129332 A1* | 6/2005 | Leisner et al. | 382/276 |
| 2005/0271300 A1* | 12/2005 | Pina | 382/294 |

OTHER PUBLICATIONS

Burt et al., "The Laplacian Pyramid as a Compact Image Code," IEEE Transactions. On Communications, vol. COM-31, No. 4, pp. 532-540, (Apr. 1983).
Daubechies, "Orthonormal Bases of Compactly Supported Wavelets, II. Variations on a Theme", Siam J. Math Anal, vol. 24, No. 2, pp. 499-519, (Mar. 1993).
Fitzgibbon et al., "Direct Least Square Fitting of Ellipses," Pattern Analysis and Machine Intelligence, vol. 21, No. 5, (May 1999).
Haglund et al., "Scale and Orientation Adaptive Filtering," Department of Electrical Engineering, Computer Vision Laboratory, S-581 83 (Linköping, Sweden, Jul. 6, 1993).
Kaiser, *A Friendly Guide to Wavelets*, "Chapter 2, Windowed Fourier Transforms", Birkhauser, Boston, pp. 44-45, (1994).
Knutsson, "Representing Local Structure Using Tensors", Linköping University, Computer Vision Laboratory, S-581 83 (Linköping, Sweden, Jun. 1989).
P. Bakker, L. J. van Vliet, P. W. Verbeek, "Edge preserving orientation adaptive filtering," Proc. IEEE-CS Conf. Computer Vision and Pattern Recognition (Fort Collins, CO, Jun. 23-25), IEEE Computer Society Press, Los Alamitos, CA, 1999, 535-540.
Press et al., *Numerical Recipes in Fortran*, Cambridge University Press, New York, pp. 498-499, 584-602, (1992).
Van De Weijer et al., "Curvature Estimation in Oriented Patterns Using Curilinear Models Applied to Gradient Vector Fields," IEEE Trans. on PAMI, vol. 23, No. 9, pp. 1035-1042, (Sep. 2001).
Van Ginkel et al., "Improved Orientation Selectivity for Orientation Estimation," SCIA'97, Proc. 10$^{th}$ Scandinavian Conference on Image Analysis, pp. 533-537, (Lappeenranta, Finland, Jun. 9-11, 1997).
Van Vliet et al., "Estimators for Orientation and Anisotropy in Digitized Images," ASCI'95, Proceedings of the first Conference of the Advanced School for Computing and Imaging, pp. 442-450, (Heijen, The Netherlands, May 16-18, 1995).

(Continued)

*Primary Examiner* — Randolph I Chu
(74) *Attorney, Agent, or Firm* — Volpe and Koenig, P.C.

(57) ABSTRACT

A method and apparatus of processing image data comprises correlating received image data. Image statistics are computed based upon the correlated image and eccentricity is estimated based upon the computed image statistics. An entropy metric of the correlated received image data is determined. An interpretation based upon the image statistics, estimated eccentricity, and entropy metric is performed and a report including the content of the processed image data is generated.

33 Claims, 13 Drawing Sheets

OTHER PUBLICATIONS

Vetterli et al., "Wavelets and Filter Banks: Theory and Design," IEEE Transactions on Signal Processing, vol. 40, No. 9, pp. 2207-2232, (Sep. 1992).

Walfram Mathworld, "Green's Theorem", Retrieved http://mathworld.wolfram.com/GreensTheorem.html, (Last Updated from on May 12, 2008).

Yong et al., "Recursive implementation of the Gaussian filter", Signal Processing 44, pp. 139-151, (Jan. 25, 1995).

Avci et al., "Comparison of Wavelet Families for Texture Classification by Using Wavelet Packet Entropy Adaptive Network Based Fuzzy Inference System", Applied Soft Computing, Elsevier, Vo. 8, No. 1, pp. 225-231, (Sep. 10, 2007).

Fitzgibbon et al., "Direct Least Square Fitting of Ellipses," Pattern Analysis and Machine Intelligence, vol. 21, No. 5, (May 1999).

Haifang et al., "A Fuzzy Mapping from Image Texture to Affective Thesaurus", Bio-Inspired Computational Intelligence and Applications, Vo. 4688, pp. 357-367, Sep. 14, 2007).

Jennting et al., "Determination of Structure Component in Image Texture Using Wavelet Analysis", Proceedings 2001 International Conference on Image Processing, ICIP 2001, vol. 3, pp. 166-169, (Oct. 7, 2001).

Knutsson, "Representing Local Structure Using Tensors", Linköping University, Computer Vision Laboratory, S-81 83 (Linköping, Sweden, Jun. 1989).

Kulkarni et al., "Fuzzy logic Based Texture Queries for CBIR", Fifth International Conference on Computational Intelligence and Multimedia Applications, 2003, pp. 223-228, (Sep. 27, 2003).

Lin et al., "Extracting Periodicity of a Regular Texture based on Autocorrelation Functions", Pattern Recognition Letters, vol. 18, No. 5, pp. 433-443, (May 1, 1997).

Simoncelli et al., "Texture Characterization via Joint Statistics of Wavelet Coefficient Magnitudes", Image Processing, 1998., ICIP 98., Vo. 1, pp. 62-66, (Oct. 4, 1998).

Van De Weijer et al., "Curvature Estimation in Oriented Patterns Using Curilinear Models Applied to Gradient Vectors Fields," IEEE Trans. on PAMI, vol. 23, No. 9, pp. 1035-1042, (Sep. 2001).

Walfram Mathworld, "Green's Theorem", Retrieved http://mathworld.wolfram.com/GreensTheorem.html, (Last Updated from on May 12, 2008).

Yang et al., "Survey on Image Content Analysis, Indexing, and Retrieval Techniques and Status Report of MPEG-7", Tamkang Journal of Science and Engineering, vol. 2, No. 3, pp. 101-118, (Jan. 1, 1999).

* cited by examiner

METHOD AND APPARATUS FOR DETERMINING IMAGE CONTENT

FIELD OF INVENTION

The present invention is directed to data processing. More particularly, the present invention is directed to a method and apparatus for processing image data.

BACKGROUND

In image processing, discerning the structure of an image is often a challenging undertaking. The structure of an image may be characterized by many attributes, such as fractal, aliased, noisy, flat or featureless, periodic, and the like. Each of these characteristics poses a challenge to analyzing the structure.

Periodic patterns, for example, can assume almost any shape, at almost any scale, may range widely in frequency of occurrence, and may occur at any location in the image. Accordingly, detecting the presence of periodic patterns with these degrees of freedom may be difficult. In particular, it may be a more difficult problem than detecting a harmonic such as a pure tone at 20 kHz. Therefore, a simple Fourier transform will not easily reveal many of the essential properties of a periodic pattern. Additionally, content structure and content spectra should not be confused, despite the fact that the mappings may be one-to-one.

Since periodic patterns range from totally featureless, (i.e., flat content having zero period), all the way up to the Nyquist frequency and beyond where they can degenerate into essentially chaotic content, examining the fully normalized phase plane correlation surface for periodicity is often not useful. Additionally, a combination or super-positioning of two or more types of periodic patterns can appear simultaneously when they are spatially co-located. Accordingly, normalized phase plane correlation can mask characteristics in the content structure.

Many attempts have been made to determine the content of image structure. However, the vast majority of these attempts focus on using the spectrum of the Fourier transform for this purpose, which is not very effective. Accordingly, it would be beneficial to provide a method and apparatus for processing image data that aids in effectively determining the content of an image.

SUMMARY

A method and apparatus of processing image data is disclosed. The method comprises correlating received image data. Image statistics are computed based upon the correlated image and eccentricity is estimated based upon the computed image statistics. An entropy metric of the correlated received image data is determined. An interpretation based upon the computed image statistics, estimated eccentricity, and entropy metric is performed and a report including the content of the processed image data is generated.

DETAILED DESCRIPTION

The present invention relates to a method and apparatus to infer the structure of an image content. The method, in one example, computes an autocorrelation function and interprets the computed autocorrelation. Some of the metrics to interpret the computed autocorrelation include estimating the content of an image, computing measures of confidence, estimating content periodicity, estimating content flatness, estimating content frequency, estimating content noisiness, and estimating content entropy. These metrics may then be combined utilizing a pre-defined set of rules to provide an estimate of the overall image surface content characteristics.

Figure 1:
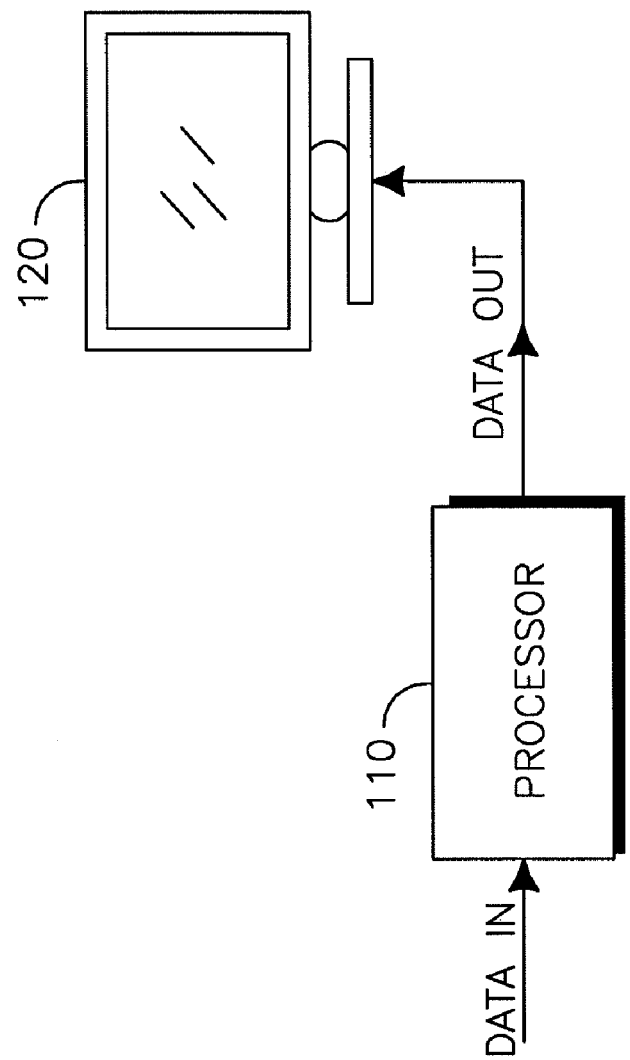
FIG. 1 is a functional block diagram of an apparatus for processing data including a processor and a display.

FIG. 1 is a functional block diagram of an apparatus 100 for processing data including a processor 110 and a display 120. As shown in FIG. 1, the processor 110 is configured to receive data in and produce a processed data out. This processed data out may be forwarded to the display 120 where it may be viewed and utilized.

Figure 2:
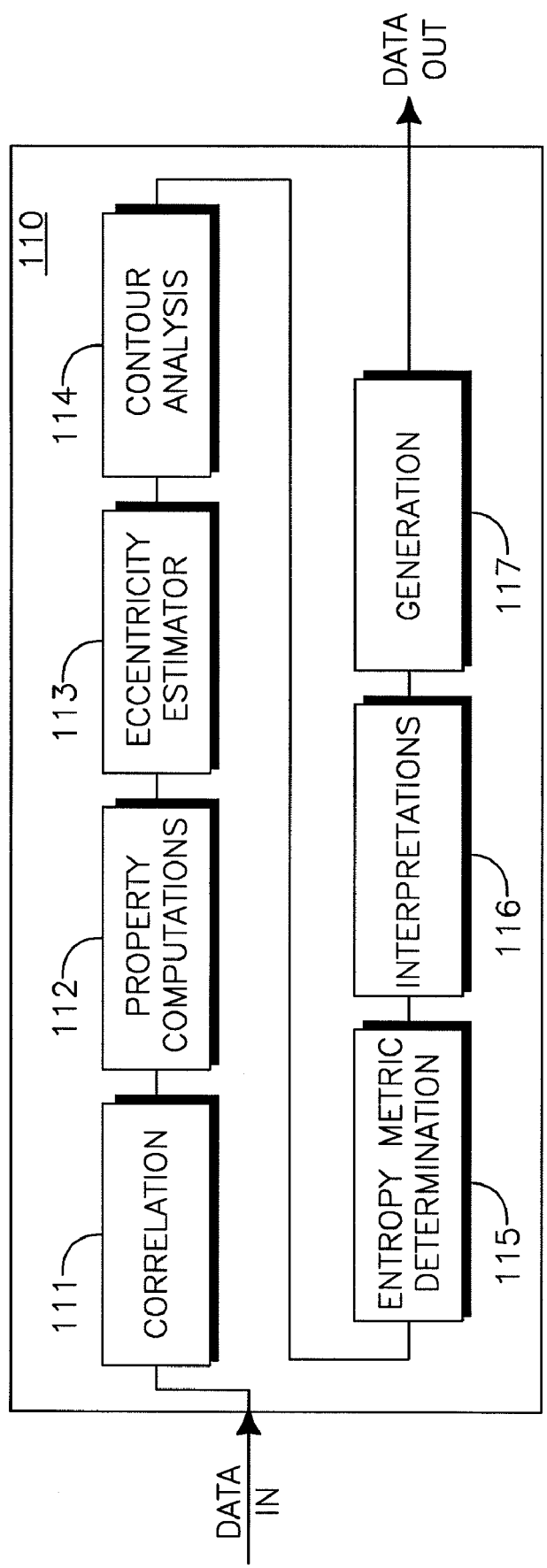
FIG. 2 is a functional block diagram of the processor of FIG. 1.

FIG. 2 is a functional block diagram of the processor 110 of FIG. 1. The processor 110 includes a correlation block 111, a property computation block 112, an eccentricity estimator 113, a contour analysis block 114, an entropy metric determination block 115, an interpretation block 116, and a generation block 117. Data is received by the correlation block 111. For example, the data in to the correlation block 111 may be image data.

Although the steps performed by each functional block of the processor 110 will be described in more detail below, briefly, the correlation block 111 performs a correlation on the data in after receiving it. The property computation block 112 computes properties related to the correlated data and the eccentricity estimator block 113 performs an estimation of eccentricity on the data. A contour analysis is performed by the contour analysis block 114 and the entropy metric determination block 115 performs a determination of entropy. Rules are applied at the interpretation block 116 to interpret the metrics measured or computed and a report is generated at the generation block 117. The generation block 117 is also capable of outputting the report as data out, which may be forwarded to, for example, the display 120 of FIG. 1.

Figure 3:
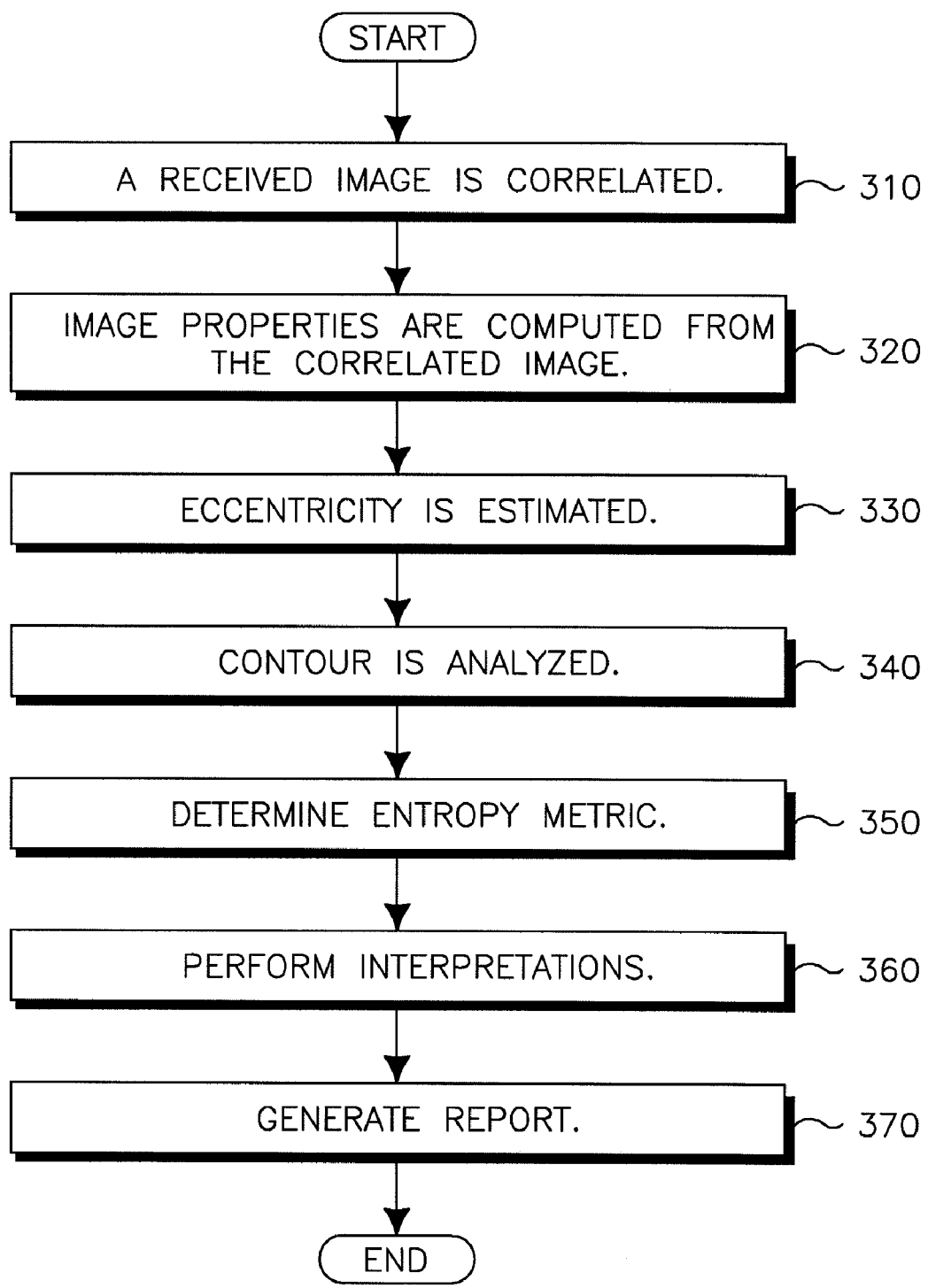
FIG. 3 is a flow diagram of a method for processing image data.

FIG. 3 is a method 300 for processing image data in accordance with the present invention. FIG. 3 is described in connection with FIGS. 4-12 to more clearly illustrate an example implementation of method 300. In step 310, a received image is correlated. For purposes of example, FIG. 4 is an example image 400 for processing in accordance with the method 300 of FIG. 3.

Figure 4:
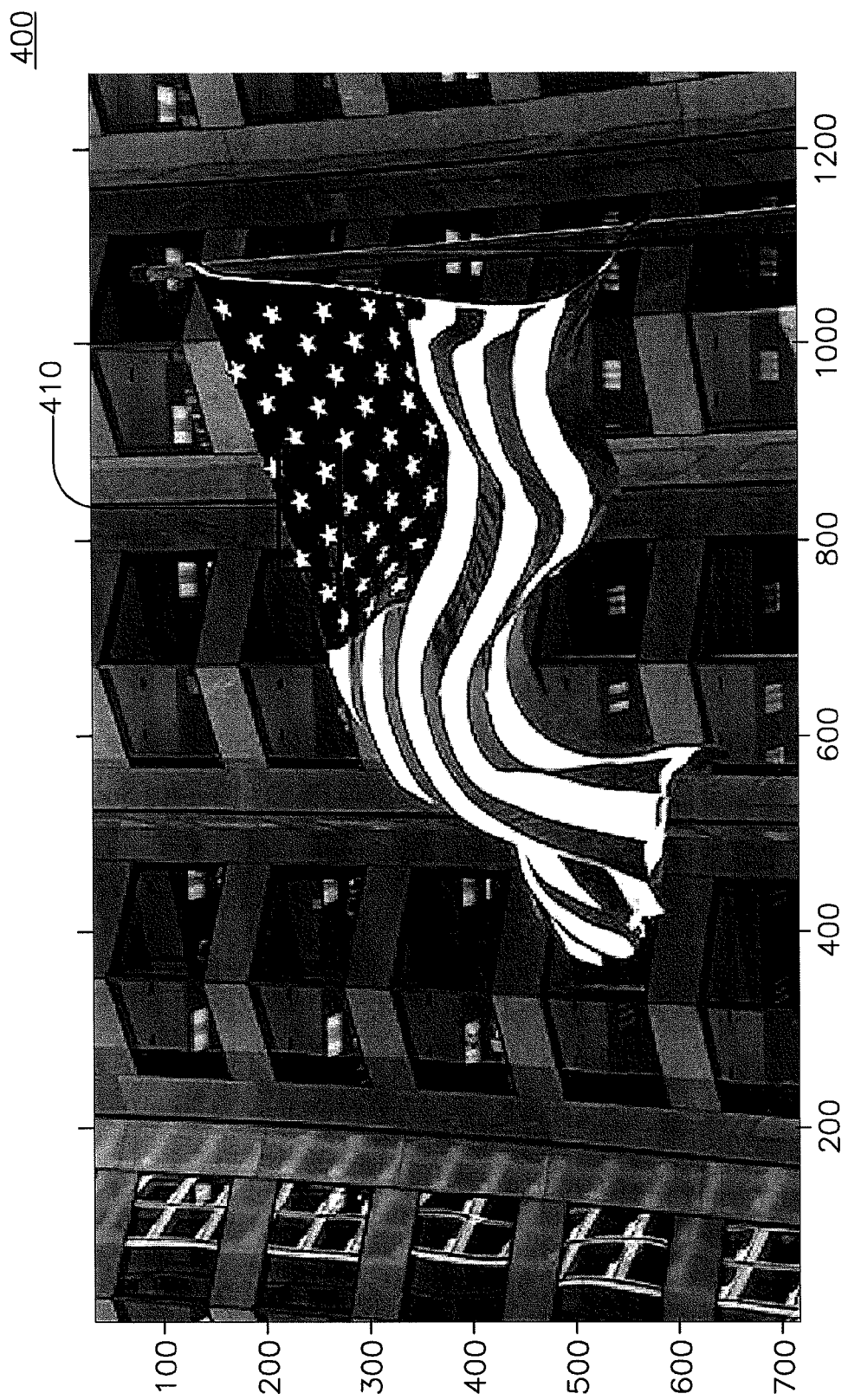
FIG. 4 is an example image for processing.

FIG. 4 shows an image 400 of the flag of the United States of America. The image 400, and particularly the flag itself, includes portions that are highly periodic. The portion 410 identified by the rectangle in the image 400 may be considered for purposes of example of the method 300. The portion 410 identified includes a 64 by 128 block containing the stars from the flag.

Figure 5:
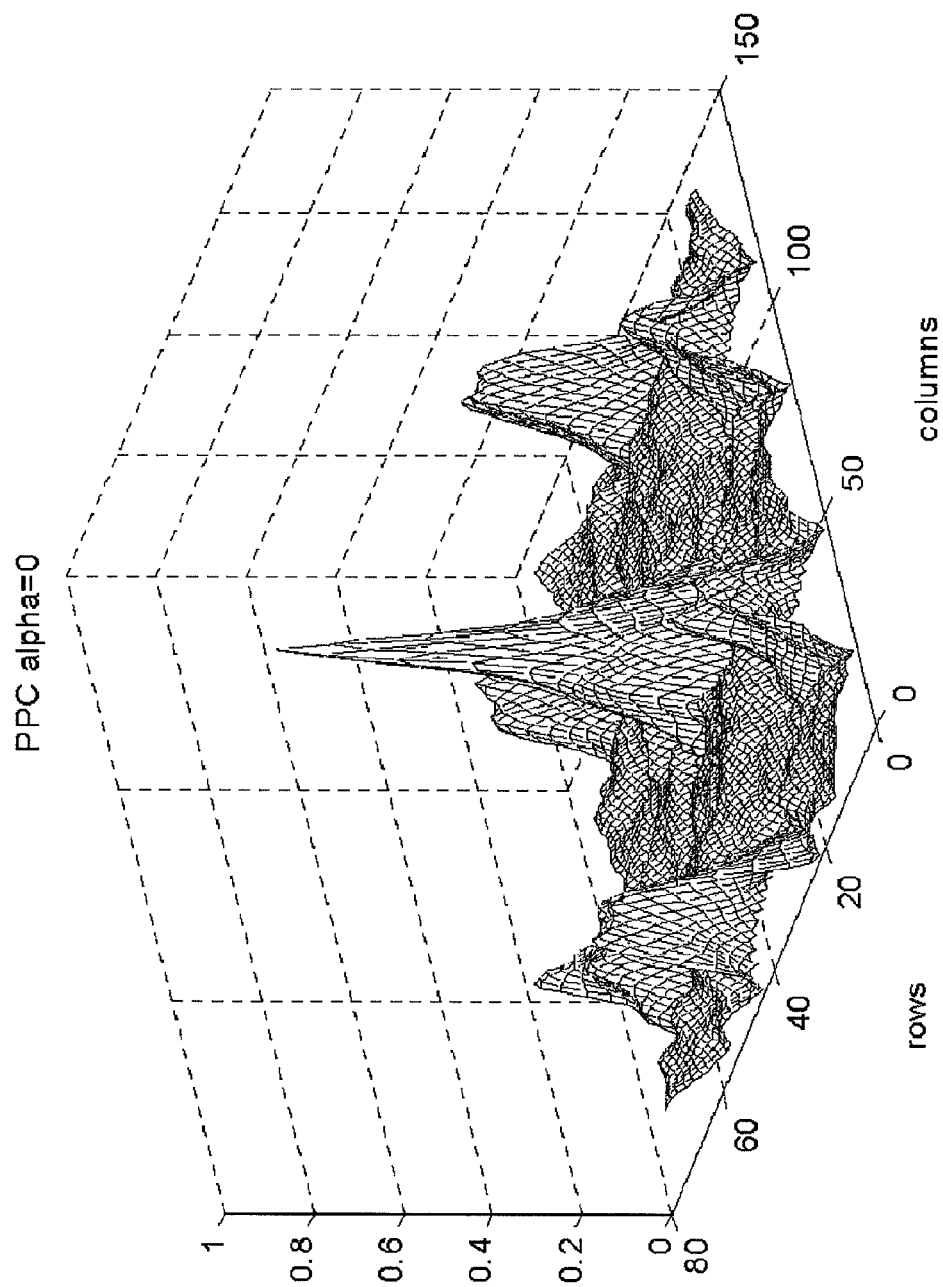
FIG. 5 is a graph of an adjusted autocorrelation surface of a portion of the example image of FIG. 4.
Figure 6:
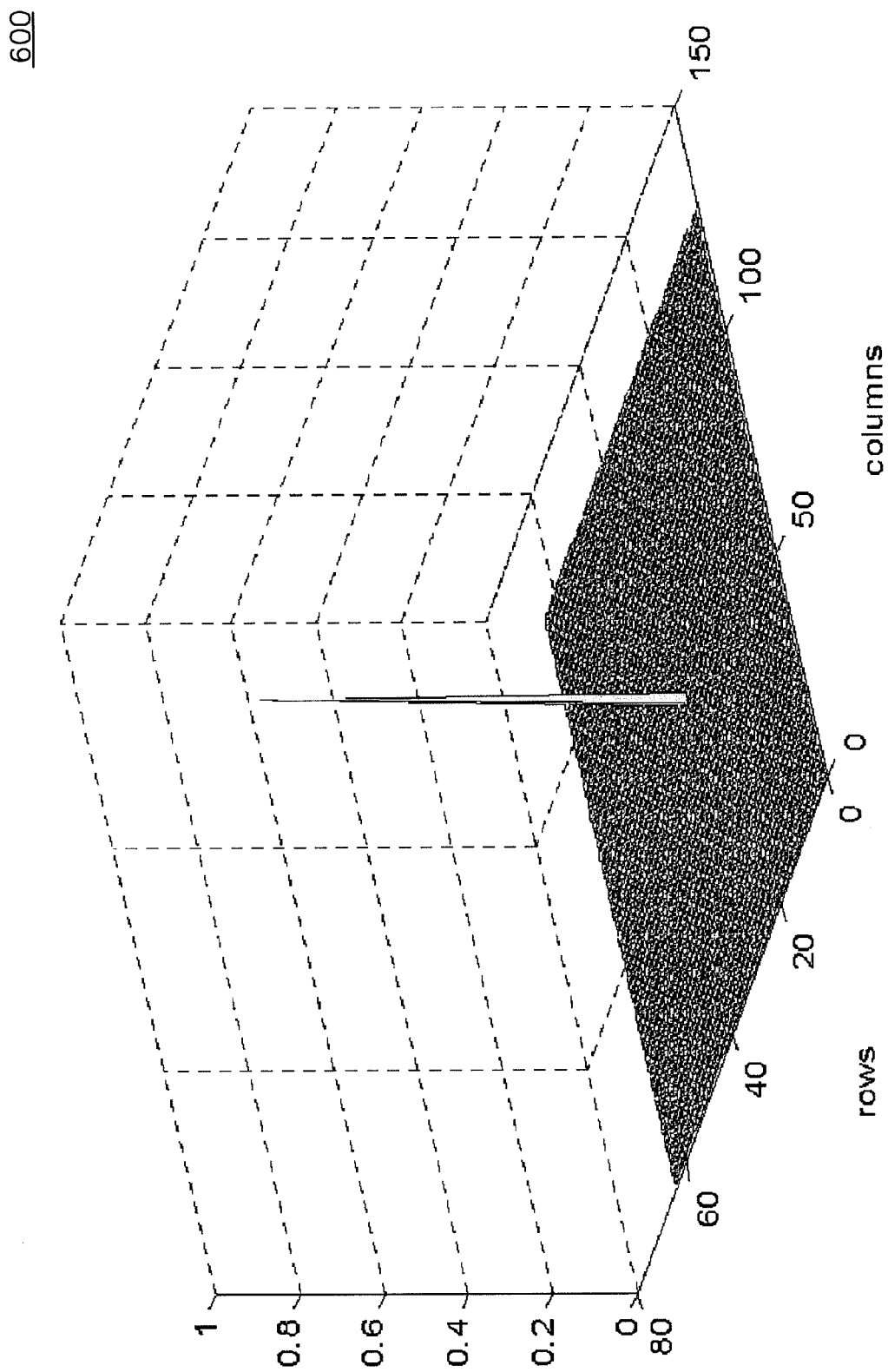
FIG. 6 is a graph of a normalized autocorrelation surface of a portion of the example image of FIG. 4.

FIG. 5 is a graph 500 of an adjusted autocorrelation surface of the portion 410 of the example image 400 of FIG. 4. As shown in FIG. 5, the adjusted autocorrelation surface is non-normalized and includes a phase plane correlation (PPC) alpha equal to zero (0). FIG. 6 is a graph 600 of a normalized autocorrelation surface of the portion 510 of the image 400 of FIG. 4. As shown in the graph 600, the normalized autocorrelation surface has a PPC alpha equal to one (1). It should be noted that either an autocorrelation or cross-correlation surface may be utilized when checking for periodic patterns in an image sequence.

Normalization is performed with respect to an area in an analysis window and a maximum grey scale. Accordingly, the correlation surface resides in the range of 0 to 1. Additionally, the autocorrelation surface is symmetric and contains an odd number of peaks.

Referring again to FIG. 3, in step 320, image properties are computed and inferred from the autocorrelation or cross-correlation surfaces. Table 1 below shows example properties that may be inferred and their relationship to the properties that are computed.

TABLE 1

Estimates Properties

| Item No. | Estimated Property | Related to |
|---|---|---|
| 1 | Degree of periodicity | number of peaks, peak support |
| 2 | Direction of preponderate similarity of content | peak eccentricity, ridge lines radiating from peak |
| 3 | Size of the structures in the analysis window | equal to approximately ½ width of peak support |
| 4 | Distance between periodic structures | distance between peaks, average distance between peaks. |
| 5 | Eccentricity of structures of interest | ratio of maximum and minimum rays radiating from peak until a valley is reached |
| 6 | Geometric relationship between periodic structures | the geometric relationship between peaks, subject to similarity in peak support, and relative peak strength |
| 7 | Texture (is the surface is noisy or not, or essentially featureless, or flat) | One peak-very narrow - content is essentially flat and/or is uncorrelated noise. If difference between peak and minimum value in the correlation surface (CS) is small, the content is essentially featureless. If max(CS) − min(CS) small but max(CS) and min(CS) closer to 1, then content has high luminance. If max(CS) − min(CS) small but max(CS) and min(CS) close to 0, then content has low luminance. If the traced ray between two peaks crosses a valley then the content is relatively distinct. Further, if the valley is deep, similar content is separated by dissimilar content. |
| 8 | Relative luminance orientation of periodic structure | if CS surface is high (>0.5), periodic elements are darker than background. if CS surface is low (<0.5), periodic elements are brighter than background. |

Some example techniques that may be used to analyze the surfaces depicted in FIGS. 5 and 6 include ridge filtering, peak extraction, valley extraction, and sink extraction. Additionally, a radon transform may be performed to determine whether there is a linear trend in the data under analysis.

Figure 7:
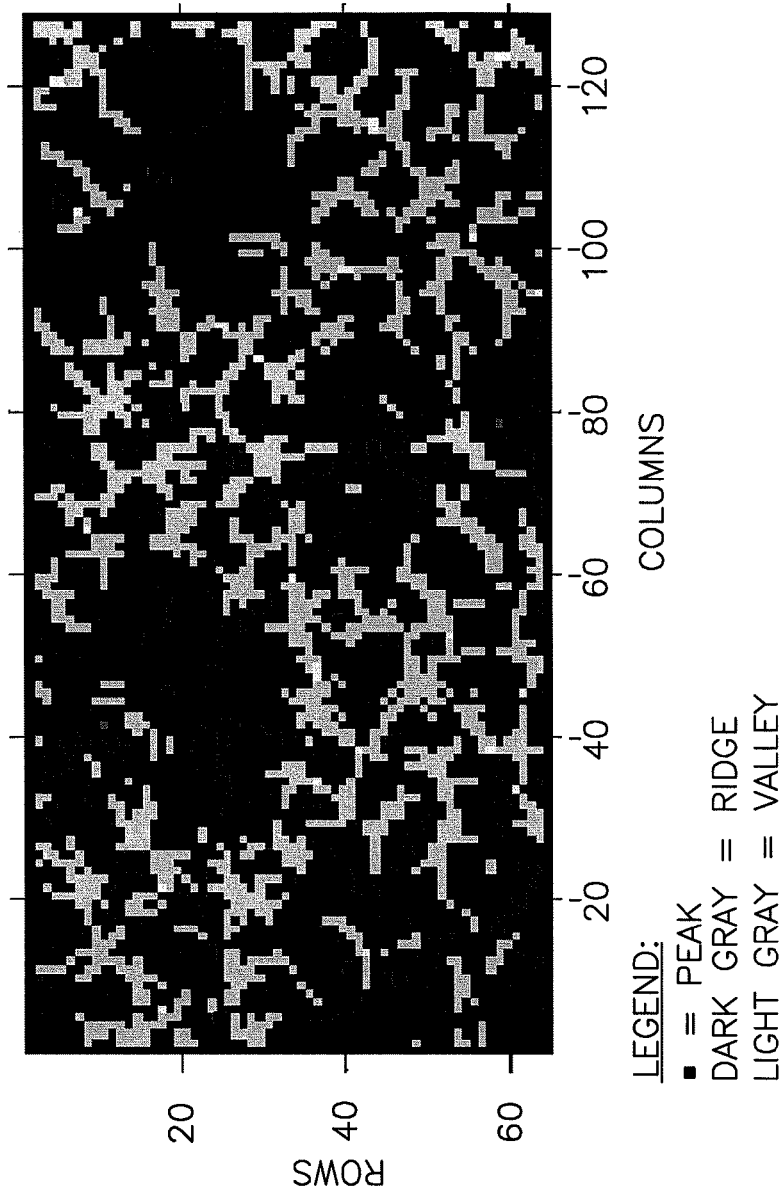
FIG. 7 is a graphical representation of peaks, ridges, valleys, and sinks of a portion of the image of FIG. 4.

FIG. 7 is a graphical representation 700 of peaks, ridges, valleys, and sinks of the portion 410 of the image 400 of FIG. 4. Eccentricity may be estimated for each peak, its support, and the direction of preponderate similarity.

Figure 8:
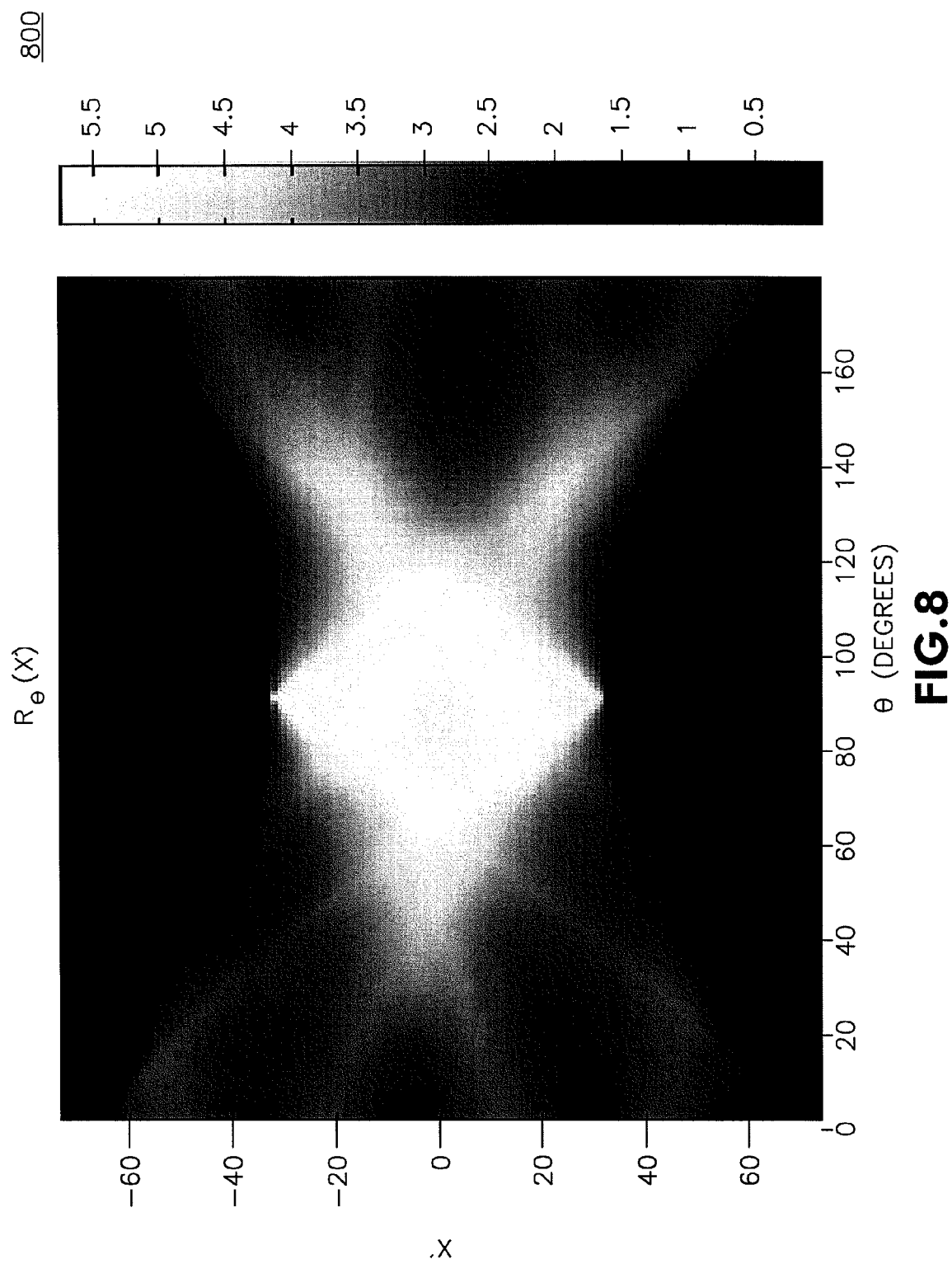
FIG. 8 is a graphical representation of a radon transform of a portion of the image of FIG. 4.
Figure 9:
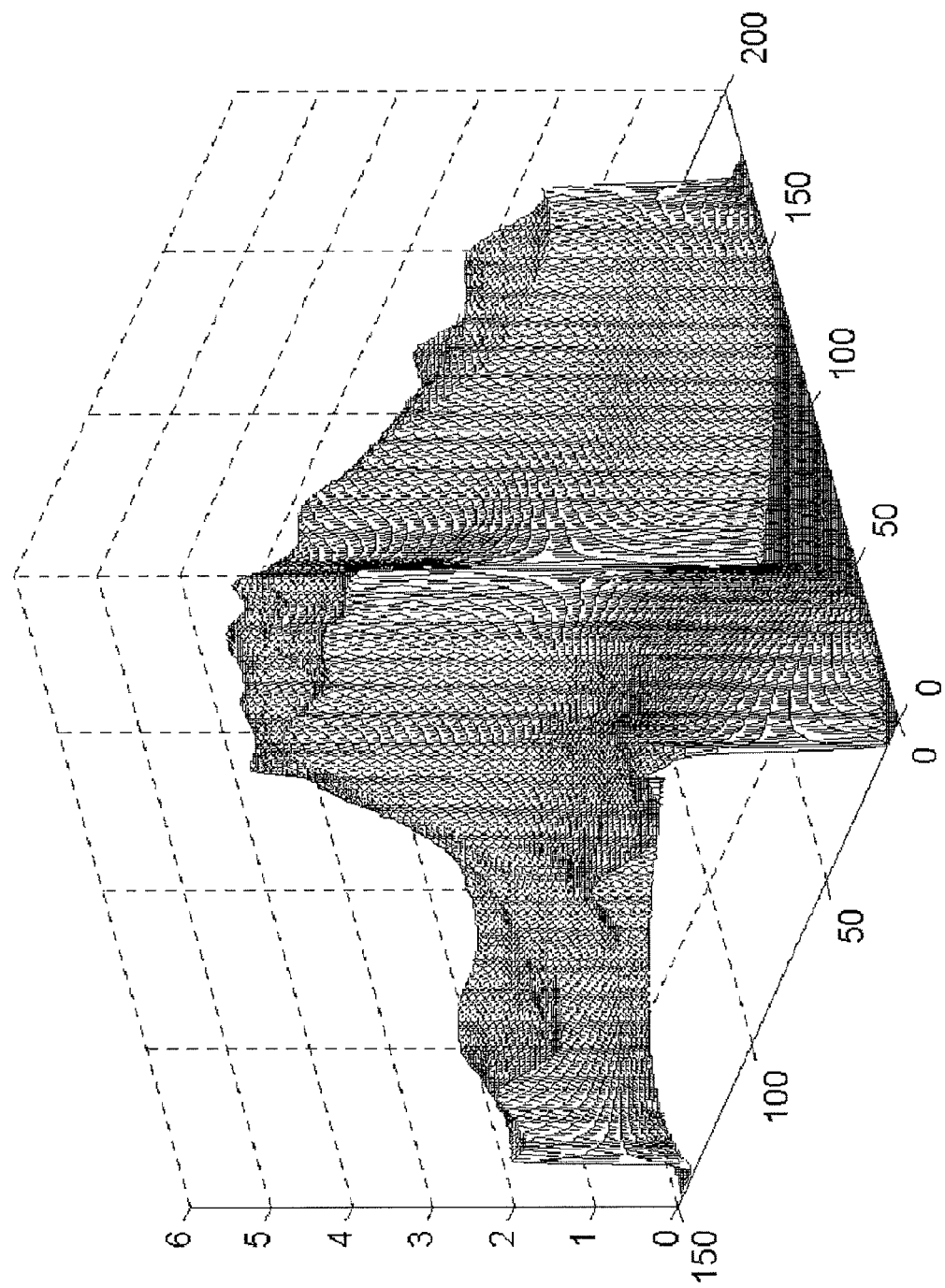
FIG. 9 is a graph of a surface map of the radon transform of FIG. 8.

In order to identify energy along one or more of the angular projections, a radon transform may be utilized. FIG. 8 is a graphical representation 800 of a radon transform of the portion 410 of the image 400. The radon surface can be parsed for peaks in the same way as either of the correlation surfaces 500 and 600. Additionally, the radon transform of either correlation surface may be used to estimate directions of preponderate similarity. FIG. 9 is a graph 900 of a surface map of the radon transform 800 of FIG. 8.

Referring again to FIG. 3, in step 330, eccentricity is estimated. Peak eccentricity suggests the direction and relative strength of the similarity of the content in the image 400. For example, if a peak is highly eccentric, (i.e., has a non-circular footprint and may resemble an elongated ellipse), the image content is likely more similar in the direction of a major axis and less similar in the direction of a minor axis.

Some of the ways to estimate peak eccentricity include fitting an ellipse about a peak or paraboloid, and obtaining a non-parametric estimate based on maximum and minimum chord lengths. Since the methods of fitting an ellipse about a peak or paraboloid may involve potential numerical instabilities, these methods may not be optimal methods in which to estimate peak eccentricity.

On the other hand, using the non-parametric approach infers parameters empirically from direct measurements of raw data, without assuming a mathematical model having estimated parameters. In one example, the non-parametric approach to estimating eccentricity includes computing, or analyzing, contours (step 340), using a watershed algorithm or by a ridge and valley method. The rays that emanate from peaks outward to an edge are computed. The rays are swept through 180 degrees while retaining maximum and minimum ray values. The ratio of these quantities may be used to estimate eccentricity.

The watershed transform, or algorithm, is utilized to identify the mass about the peaks in the autocorrelation surface. The mass, which may include the mean support or peak footprint at various watermarks, provides information about the image content.

Figure 10:
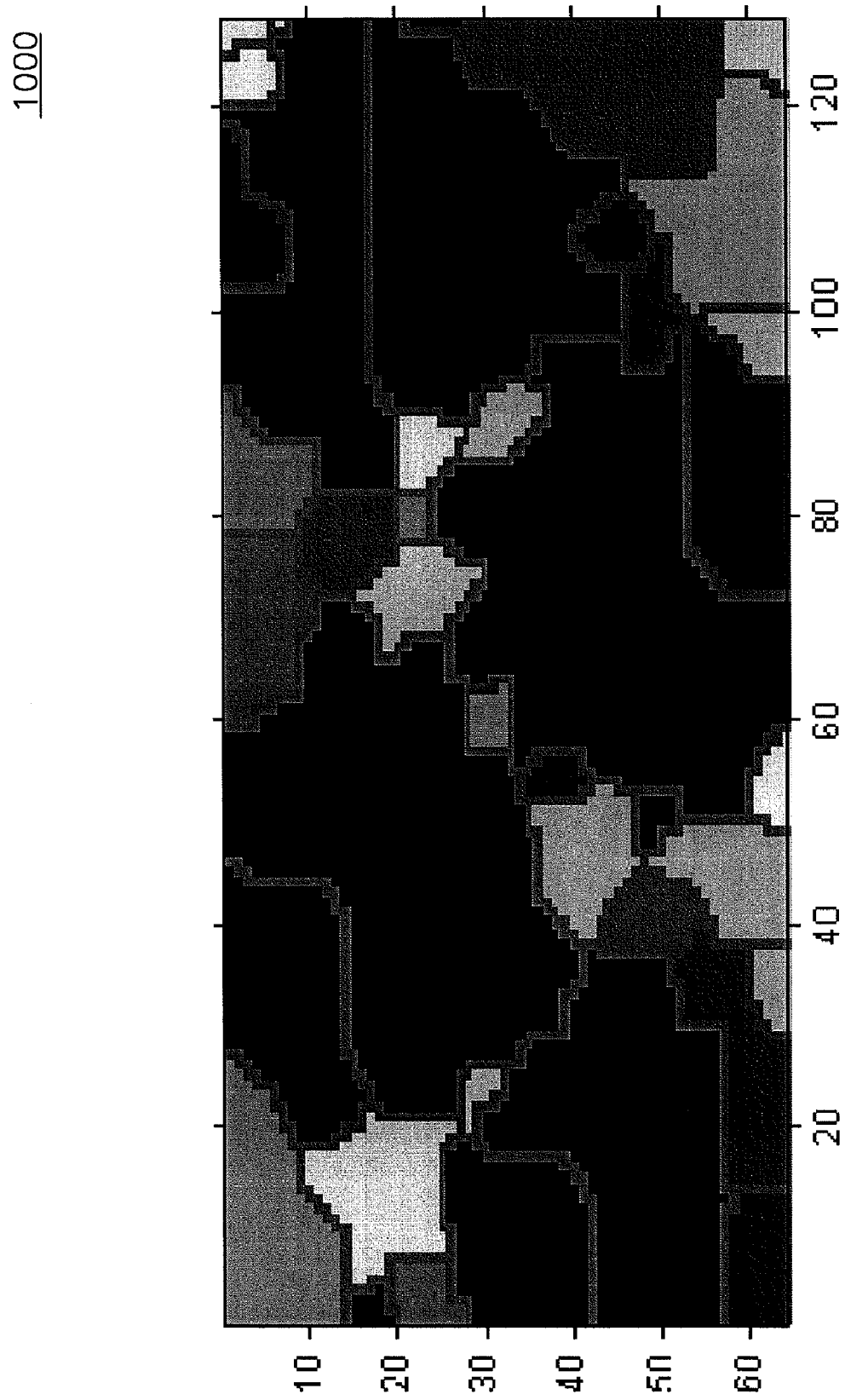
FIG. 10 is a graphical representation of a watershed transform of a portion of the image of FIG. 4.
Figure 11:
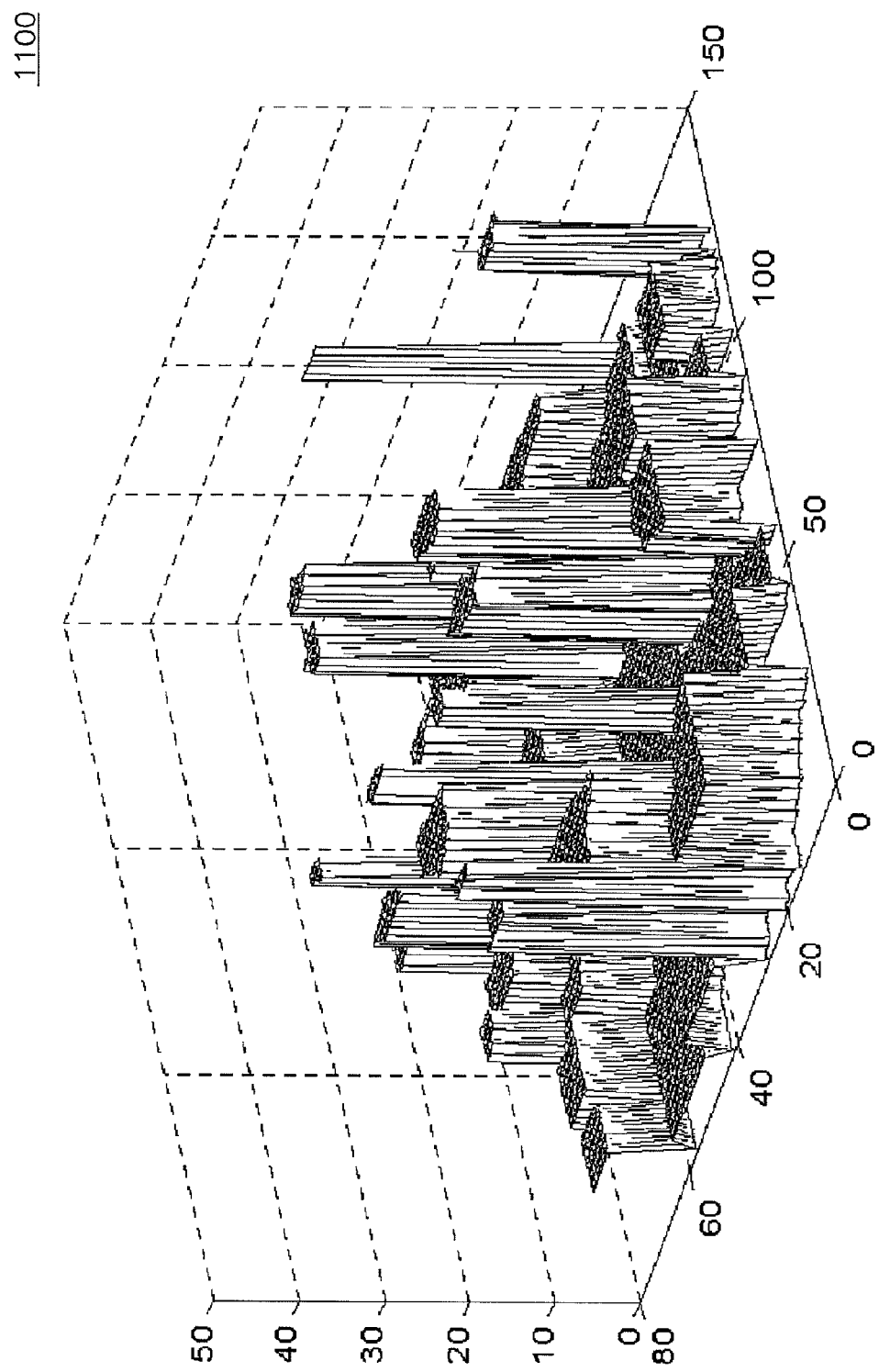
FIG. 11 is a graph of a surface map of the watershed transform of FIG. 10.

FIG. 10 is a graphical representation 1000 of a watershed transform of the portion 410 of the image 400 of FIG. 4. The graphical representation 1000 shows a decomposition of the watershed transform. FIG. 11 is a graph 1100 of a surface map of the watershed transform 1000 of FIG. 10. In particular, the graph 1100 shows a level set surface map. In order to collect the points that form the contour in FIGS. 10 and 11, a contour parsing is performed. Table 2 below shows an example "state-machine" that may be utilized to parse the boundary of an object that is determined from a watershed algorithm.

TABLE 2

Perimeter parsing state machine

| State | Pattern | Action | Comment |
|---|---|---|---|
| 0 | 0 0 | move right | Outside object - search for object boundary |
| | 0 0 | | |

TABLE 2-continued

Perimeter parsing state machine

| State | Pattern | | Action | Comment |
|---|---|---|---|---|
| 1 | 0 0 | 1 0 | move right | |
| 2 | 1 0 | 0 0 | move up | |
| 3 | 1 0 | 1 0 | move right | |
| 4 | 0 1 | 0 0 | move left | |
| 5 | 0 1 | 1 0 | move left | Ambiguous state |
| 6 | 1 1 | 0 0 | move up | |
| 7 | 1 1 | 1 0 | move right | |
| 8 | 0 0 | 0 1 | move down | |
| 9 | 0 0 | 1 1 | move down | |
| 10 | 1 0 | 0 1 | move down | Ambiguous state |
| 11 | 1 0 | 1 1 | move down | |
| 12 | 0 1 | 0 1 | move left | |
| 13 | 0 1 | 1 1 | move left | |
| 14 | 1 1 | 0 1 | move up | |
| 15 | 1 1 | 1 1 | move right | Inside object - move to perimeter |

Referring now to Table 2 above, since it is possible for each of the two-by-two tables depicted in the "Pattern" column of the table to be the result of a logical expression, different types of contours may be efficiently followed. Also, it should be noted that although a two dimensional object is used as an example, this concept may be extended to an arbitrary number of dimensions.

Figure 12:
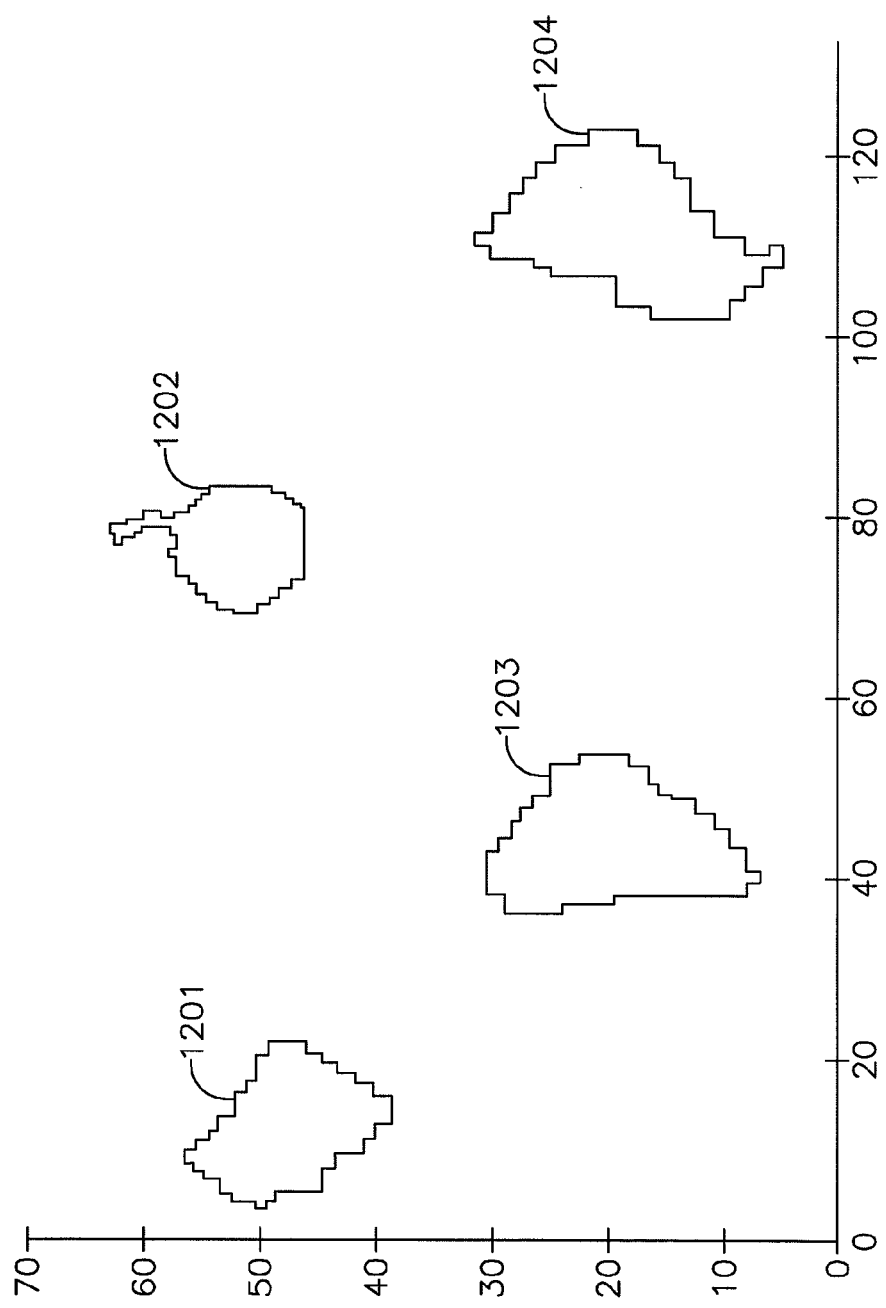
FIG. 12 is a graph of a level set of the autocorrelation surface of the portion of the image of FIG. 4.

FIG. 12 is a graph 1200 of a level set of the autocorrelation surface of the portion 410 of the image 400 of FIG. 4. As shown in FIG. 12, four objects, (designated 1201, 1202, 1203, and 1204), are shown. Each object corresponds to a specific level set of the autocorrelation surface and parsed perimeter, respectively. In the present example, the content is shifted by (10,10) pixels. Accordingly, the principal peak does not occur at the center of the autocorrelation surface.

One way to estimate area of an object that is enclosed by curves that do not cross over themselves is Green's Theorem, which by way of example is shown in the equation below:

$$\text{Area} = \frac{1}{2} \sum_{i=1}^{n-1} (x_{i+1} + x_i)(y_{i+1} - y_i) - (y_{i+1} + y_i)(x_{i+1} - x_i). \quad \text{Equation (1)}$$

Accordingly, using equation (1), the areas computed for objects 1201, 1202, 1203, and 1204 are 256, 277, 207, and 281 square pixels, respectively.

Alternatively to using equation (1) above, the area may be computed by extracting the area surrounding an object and computing the number of non-zero pixels. However, this method may require foreknowledge of the shape of objects.

In addition to estimating the periodicity of the content in the image, it may be beneficial to estimate the size of the structures. One way to accomplish this estimation is by parsing the perimeter of an object level set projection. Another way is to estimate the eccentricity of the object.

One way to estimate an object's size is to determine the peak support of the object. For example, an ellipse may be fitted around the major and minor axes of rays determined from an object in order to determine the size and orientation of the structures that led to the rays. The area of the ellipse may be used as an estimate for the object's size. However, if the major or minor axes are limited by the size of the analysis window, it may be assumed that the structures in the image extend beyond the analysis window. This could be indicated by asserting a "spillover" flag.

In step 350, the entropy metric is determined. The entropy metric is a local measure that is utilized to estimate the orientation and scale of structures in the image by first applying an anisotropic decomposition of the image and then computing a measure defined by the following equation:

$$c(\Omega) = 1 - \frac{\int_\Omega v(x, y)}{\int_\Omega |v(x, y)|}, \quad \text{Equation (2)}$$

where v(x, y) is the anisotropic orientation vector adjusted to lie in the range [0, π] and Ω is the region over which the entropy is computed. In the discrete domain, the entropy measure becomes:

$$c(i, j) = 1 - \frac{\sum_{i=-\lfloor h/2 \rfloor}^{\lceil h/2 \rceil} \sum_{j=-\lfloor w/2 \rfloor}^{\lceil w/2 \rceil} v(i, j)}{\sum_{i=-\lfloor h/2 \rfloor}^{\lceil h/2 \rceil} \sum_{j=-\lfloor w/2 \rfloor}^{\lceil w/2 \rceil} |v(i, j)|}, \quad \text{Equation (3)}$$

where w and h are the block height and block width. This measure lies in the interval [0, 1]. It is also possible to define a variant of this measure that takes into account the magnitude of the anisotropic vectors. This is done so that relatively flat regions are given less importance. In flat regions, there is often no structure present, so the anisotropic vectors can become confused due to having many haphazard orientations depending on noise. It may not be desirable to consider these as important. To facilitate this variant, the entropy measure may therefore be modified in accordance with the following equation:

$$c(i, j) = 1 - \frac{1}{wh} \sum_{i=-\lfloor h/2 \rfloor}^{\lceil h/2 \rceil} \sum_{j=-\lfloor w/2 \rfloor}^{\lceil w/2 \rceil} v(i, j). \quad \text{Equation (4)}$$

Figure 13:
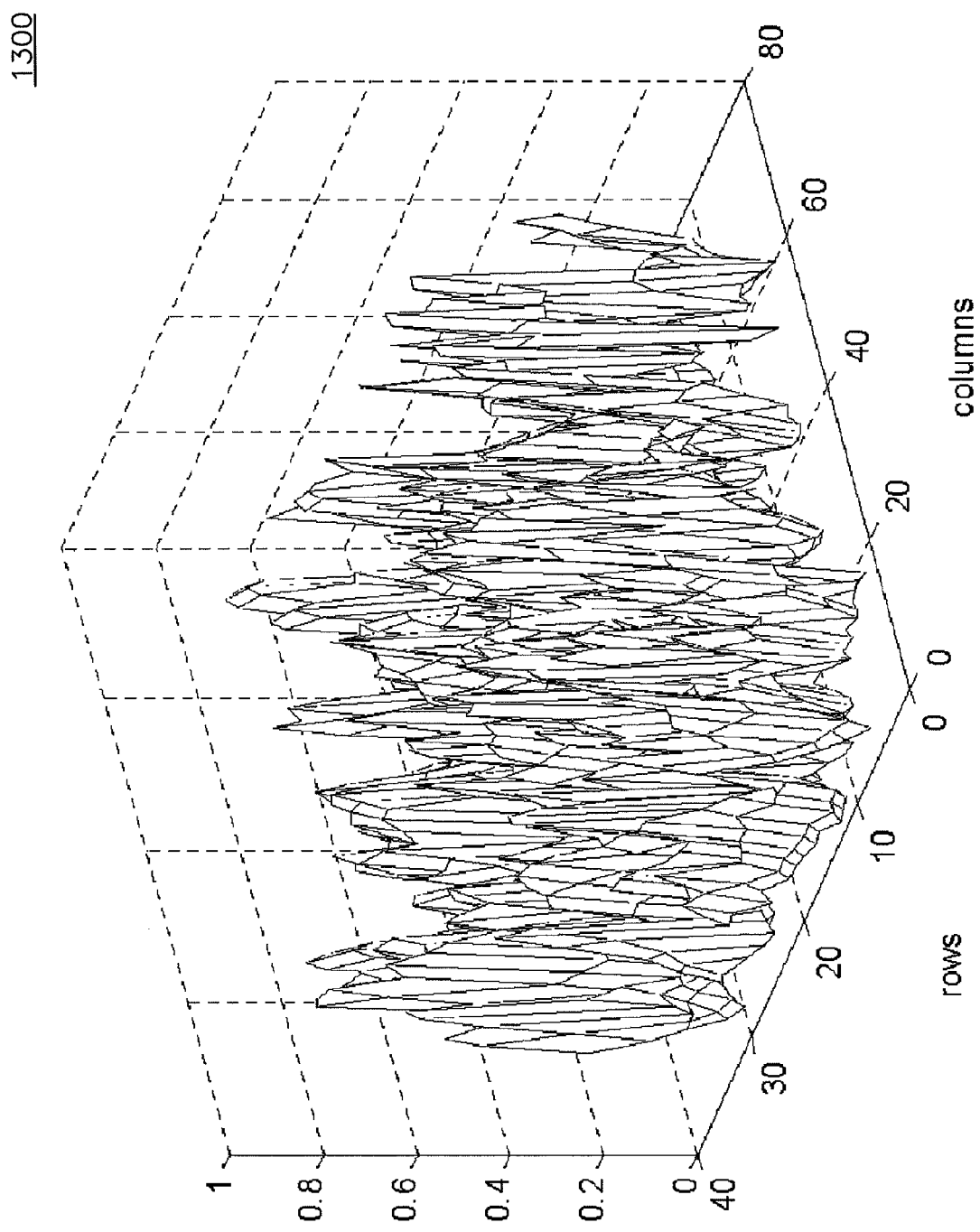
FIG. 13 is a graph of an entropy surface of the portion of the image of FIG. 4.

In one respect, the entropy matrix is an indication of the lack of uniformity of direction of the gradients in a local part of the image. If the c(i, j) is close to 1, then there are a great deal of changes in direction in the analysis window which could be indicative of very small, but defined, structures. Alternatively, if it is close to zero, there is a great deal of uniformity in direction and so there is well defined homogeneous directional structures in the analysis window. An example entropy metric is shown in FIG. 13, which is a graph 1300 of an entropy surface of the portion 410 the image 400 of FIG. 4.

With the entropy measure, it becomes possible to make some determinations regarding the nature of the content within the analysis window. For example, if the correlation surface contains a large number of peaks, and the entropy measure is small, then the content is directionally structured with high periodicity. An example of this would be a zone plate below the Nyquist frequency.

If the correlation surface contains a large number of peaks, and the entropy measure is large, then the content is directionally unstructured with high periodicity. An example of this would be a highly textured surface such as a checkerboard pattern. Also, if the correlation surface contains one peak with small support, and the Entropy measure is large, then the content is probably best approximated by uncorrelated noise. An example of this would be a speckled background.

Another measure of image content that can be derived from the autocorrelation function is the noisiness, which may be determined in accordance with the following equation:

$$n = 1 - \frac{p_2 - \bar{p}}{p_1 - \bar{p}},\qquad\text{Equation (5)}$$

where $p_1$, $p_2$ and $\bar{p}$ are the largest, second largest and average peak heights derived from the autocorrelation surface. This measure is in the interval [0, 1] and is applicable when there is more than one peak, both are greater than the average, and when the peak support of the largest peak is small. So the 'noisier' the content, the closer the noise metric is to 1. In recognition that the noisiness measure is only applicable when the peak support is small, the noisiness measure can be modified to take this into account in accordance with the following equation:

$$n' = n \times (1 - p_s),\qquad\text{Equation (6)}$$

where $p_s$ is the peak support.

Another measurement that is useful to know is how similar images are to one another. A similarity measure is a number between 0 and 1 that is intended to capture image similarity. It is based on the PPC (alpha=1) cross correlation, and may be defined in accordance with the following equation:

$$s = p_1 \times \frac{hw}{(h - \Delta h)(w - \Delta w)},\qquad\text{Equation (7)}$$

where $p_1$ is the amplitude of the largest peak $\Delta h$ and $\Delta w$ are the vertical and horizontal displacement from the origin of the largest peak, respectively.

In addition, whenever it is necessary to make a decision based on analogue, (i.e., continuous), inputs and represent the decision with a few discrete categories, there is often a need to apply interpretive rules (see step 360 of FIG. 3). Whether a surface is noisy or not is a question of degree. It may be very noisy, slightly noisy, completely noise-free, or somewhere in between. To deal with this reality, rules are required that build some flexibility into the final outcome. The framework developed by "Fuzzy logic" that combines a membership function and logical operators may be utilized to construct these interpretive rules, that will combine the various inputs and come up with an overall estimate of surface structure.

In step 370, a report, (e.g., data is output or data is stored in memory), is generated from the analysis performed in the previous steps. In one example, the report may be split into two parts. The first is a factual reporting of the computed statistics, and the second is the interpretive portion that uses rules to qualify the content. The statistics generated in this report may aid in determining the nature of the content of the image. This report may then be utilized to determine the structure and content of the image for display or further processing. For example, the report may contain information relating to the structure such as the periodicity, eccentricity, fractal attributes, aliased attributes, noisiness, and the like. In addition, attributes such as the flatness or featurelessness of the image may be included.

Although the features and elements of the present invention are described in the example embodiments in particular combinations, each feature or element can be used alone without the other features and elements of the example embodiments or in various combinations with or without other features and elements of the present invention. The present invention may be implemented in a computer program or firmware tangibly embodied in a computer-readable storage medium having machine readable instructions for execution by a machine, a processor, and/or any general purpose computer for use with or by any non-volatile memory device. Suitable processors include, by way of example, both general and special purpose processors.

Typically, a processor will receive instructions and data from a read only memory (ROM), a RAM, and/or a storage device having stored software or firmware. Storage devices suitable for embodying computer program instructions and data include all forms of non-volatile memory, including by way of example semiconductor memory devices, read only memories (ROMs), magnetic media such as internal hard disks and removable disks, magneto-optical media, and optical media such as CD-ROM disks and digital versatile disks (DVDs). Types of hardware components, processors, or machines which may be used by or in conjunction with the present invention include Application Specific Integrated Circuits (ASICs), Field Programmable Gate Arrays (FPGAs), microprocessors, or any integrated circuit.

What is claimed is:

1. A method of processing image data, implemented in a non-transitory computer readable medium, the method comprising:
    correlating received image data;
    computing image statistics based upon the correlated image;
    estimating eccentricity based upon the computed image statistics;
    determining an entropy metric of the correlated received image data, wherein the entropy metric is determined based on a sum of a plurality of anisotropic orientation vectors of the correlated received image data;
    performing an interpretation based upon the computed image statistics, estimated eccentricity, and entropy metric; and
    generating a report including the content of the processed image data, wherein the report includes information relating to the structural content of the image for display or further processing of the image.

2. The method of claim 1, further comprising analyzing contour of the image data.

3. The method of claim 1 wherein correlating received image data includes generating an auto-correlation surface of the image.

4. The method of claim 1 wherein the structural content includes at least one of the following: fractal attributes, aliased attributes, noisiness, featurelessness, and flatness.

5. The method of claim 1 wherein the image statistics include any one of the following: degree of periodicity, direction of preponderate similarity of content, size of structures in an analysis window, distance between periodic structures, eccentricity of structures, geometric relationship between periodic structures, texture, and relative luminance orientation of periodic structures.

6. The method of claim 1, further comprising applying at least one of the following on the autocorrelation surface: a ridge filter to the autocorrelation surface, a peak extraction, a valley extraction, and a sink extraction.

7. The method of claim 1, further comprising a radon transform on the autocorrelation surface.

8. The method of claim 7, further comprising estimating directions of preponderate similarity.

9. The method of claim 1 wherein estimating eccentricity includes obtaining a non-parametric estimate.

10. The method of claim 9 wherein the non-parametric estimate is based upon maximum and minimum chord lengths.

11. The method of claim 9, further comprising computing contours using at least one of the following: a watershed algorithm, and a ridge and valley extraction.

12. The method of claim 1 wherein determining an entropy metric includes applying an anisotropic decomposition to the received image.

13. The method of claim 1, further comprising determining a noisiness value of the correlated image.

14. The method of claim 1 wherein the report includes a first section and a second section.

15. The method of claim 14 wherein the first section of the report includes a factual report of the computed statistics.

16. The method of claim 14 wherein the second section of the report includes an interpretive report of the computed statistics.

17. A processor for processing image data comprising:
a correlation device configured to perform a correlation on a received image;
a property computation device in communication with the correlation device, the property computation device configured to compute image statistics based upon the correlated image;
an eccentricity estimator device in communication with the property computation device, the eccentricity estimator device configured to estimate eccentricity based upon the computed image statistics;
an entropy metric determination device in communication with the eccentricity estimator device, the entropy metric determination device configured to determine an entropy metric of the correlated received image data, wherein the entropy metric is determined based on a sum of a plurality of anisotropic orientation vectors of the correlated received image data;
an interpretations device in communication with the entropy metric determination device, the interpretations device configured to perform an interpretation based upon the image statistics, estimated eccentricity, and entropy metric; and
a generation device in communication with the interpretations device, the generation device configured to generate a report including the content of the processed image data, wherein the report includes information relating to the structural content of the image for display or further processing of the image.

18. The processor of claim 17 wherein the structural content includes at least one of the following: fractal attributes, aliased attributes, noisiness, featurelessness, or flatness.

19. The processor of claim 17, further comprising a contour analysis device in communication with the eccentricity estimator and the entropy metric determination block, the contour analysis block configured to compute contours.

20. The processor of claim 17, wherein the processor is in communication with a display, the display being configured to receive data from the processor and to display the data.

21. The processor of claim 20 wherein the display is configured to receive the data from the generation device of the processor.

22. A non-transitory computer-readable storage medium containing a first set of instructions, when executed by a processor allow the processor to:
correlate received image data;
compute image statistics based upon the correlated image;
estimate eccentricity based upon the computed image statistics;
determine an entropy metric of the correlated received image data, wherein the entropy metric is determined based on a sum of a plurality of anisotropic orientation vectors of the correlated received image data;
perform an interpretation based upon the computed image statistics, estimated eccentricity, and entropy metric; and
generate a report including the content of the processed image data, wherein the report includes information relating to the structural content of the image for display or further processing of the image.

23. A non-transitory computer-readable storage medium containing a set of instructions comprising:
a correlating code segment for correlating received image data;
a computing code segment for computing image statistics based upon the correlated image;
an estimating code segment for estimating eccentricity based upon the computed image statistics;
a determining code segment for determining an entropy metric of the correlated received image data, wherein the entropy metric is determined based on a sum of a plurality of anisotropic orientation vectors of the correlated received image data;
an interpreting code segment performing an interpretation based upon the computed image statistics, estimated eccentricity, and entropy metric; and
a generating code segment for generating a report including the content of the processed image data, wherein the report includes information relating to the structural content of the image for display or further processing of the image.

24. The non-transitory computer-readable storage medium of claim 23 further comprising an adjusting code segment for adjusting each anisotropic orientation vector not lying in a predetermined region of a coordinate system to lie in the predetermined region.

25. The method of claim 1 wherein each anisotropic orientation vector not lying in a predetermined region of a coordinate system is adjusted to lie in the predetermined region.

26. The method of claim 1 wherein the entropy metric, c, is determined as $$c = 1 - \frac{\sum_{i=-\lfloor h/2 \rfloor}^{\lceil h/2 \rceil} \sum_{j=-\lfloor w/2 \rfloor}^{\lceil w/2 \rceil} v(i,j)}{\sum_{i=-\lfloor h/2 \rfloor}^{\lceil h/2 \rceil} \sum_{j=-\lfloor w/2 \rfloor}^{\lceil w/2 \rceil} |v(i,j)|},$$

wherein $v(i,j)$ is the anisotropic orientation vector at location $(i,j)$, h is the height a region of the image data, w is the width of the region of the image data, $\lfloor \rfloor$ is a floor operator, $\lceil \rceil$ is a ceiling operator, and $\| \|$ is a vector norm operator.

27. The method of claim 1 wherein the entropy metric, c, is determined as $$c = 1 - \frac{1}{wh} \sum_{i=-\lfloor h/2 \rfloor}^{\lceil h/2 \rceil} \sum_{j=-\lfloor w/2 \rfloor}^{\lceil w/2 \rceil} v(i, j),$$

wherein v(i,j) is the anisotropic orientation vector at location (i,j), h is the height a region of the image data, w is the width of the region of the image data, ⌊ ⌋ is a floor operator, and ⌈ ⌉ is a ceiling operator.

28. The method of claim 1 wherein the entropy metric is valued between 0 and 1.

29. The processor of claim 17 wherein the entropy metric determination device is further configured to adjust each anisotropic orientation vector not lying in a predetermined region of a coordinate system to lie in the predetermined region.

30. The processor of claim 17 wherein the entropy metric, c, is determined as $$c = 1 - \frac{\sum_{i=-\lfloor h/2 \rfloor}^{\lceil h/2 \rceil} \sum_{j=-\lfloor w/2 \rfloor}^{\lceil w/2 \rceil} v(i, j)}{\sum_{i=-\lfloor h/2 \rfloor}^{\lceil h/2 \rceil} \sum_{j=-\lfloor w/2 \rfloor}^{\lceil w/2 \rceil} |v(i, j)|},$$

wherein v(i,j) is the anisotropic orientation vector at location (i,j), h is the height a region of the image data, w is the width of the region of the image data, ⌊ ⌋ is a floor operator, ⌈ ⌉ is a ceiling operator, and ‖ ‖ is a vector norm operator.

31. The processor of claim 17 wherein the entropy metric, c, is determined as $$c = 1 - \frac{1}{wh} \sum_{i=-\lfloor h/2 \rfloor}^{\lceil h/2 \rceil} \sum_{j=-\lfloor w/2 \rfloor}^{\lceil w/2 \rceil} v(i, j),$$

wherein v(i,j) is the anisotropic orientation vector at location (i,j), h is the height a region of the image data, w is the width of the region of the image data, ⌊ ⌋ is a floor operator, and ⌈ ⌉ is a ceiling operator.

32. The processor of claim 17 wherein the entropy metric is valued between 0 and 1.

33. The non-transitory computer-readable storage medium of claim 22 wherein each anisotropic orientation vector not lying in a predetermined region of a coordinate system is adjusted to lie in the predetermined region.

* * * * *

UNITED STATES PATENT AND TRADEMARK OFFICE
CERTIFICATE OF CORRECTION

| | | |
|---|---|---|
| PATENT NO. | : 8,233,719 B2 | |
| APPLICATION NO. | : 11/961330 | |
| DATED | : July 31, 2012 | |
| INVENTOR(S) | : Gordon F. Wredenhagen | |

It is certified that error appears in the above-identified patent and that said Letters Patent is hereby corrected as shown below:

IN THE CLAIMS

Column 10, Line 65, Claim 26, after the word "height" insert the word --of--.
Column 11, Line 10, Claim 27, after the word "height" insert the word --of--.
Column 12, Line 2, Claim 30, after the word "height" insert the word --of--.
Column 12, Line 16, Claim 31, after the word "height" insert the word --of--.

Signed and Sealed this
First Day of January, 2013

David J. Kappos
*Director of the United States Patent and Trademark Office*